United States Patent
Schubring et al.

(10) Patent No.: US 11,254,535 B2
(45) Date of Patent: Feb. 22, 2022

(54) CONTROL FOR PARENT ROLL UNWINDING APPARATUS AND METHODS

(71) Applicant: Paper Converting Machine Company, Green Bay, WI (US)

(72) Inventors: Cory L. Schubring, De Pere, WI (US); Scott K. Houle, Green Bay, WI (US); Cory P. Gussert, Pulaski, WI (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 323 days.

(21) Appl. No.: 16/372,897

(22) Filed: Apr. 2, 2019

(65) Prior Publication Data

US 2019/0308839 A1 Oct. 10, 2019

Related U.S. Application Data

(60) Provisional application No. 62/652,499, filed on Apr. 4, 2018.

(51) Int. Cl.
*B65H 23/00* (2006.01)
*B65H 23/04* (2006.01)

(52) U.S. Cl.
CPC ......... *B65H 23/005* (2013.01); *B65H 23/044* (2013.01); *B65H 2511/142* (2013.01)

(58) Field of Classification Search
None
See application file for complete search history.

(56) References Cited

U.S. PATENT DOCUMENTS

| 6,440,268 B1 | 8/2002 | Baggot et al. |
| 6,755,940 B2 | 6/2004 | Lin et al. |
| 7,000,864 B2 | 2/2006 | McNeil et al. |
| 7,127,951 B2 | 10/2006 | Sartain et al. |
| 9,845,574 B2 | 12/2017 | Bomstad et al. |

(Continued)

FOREIGN PATENT DOCUMENTS

| EP | 1530044 B1 | 9/2011 |
| WO | 2018109790 A3 | 6/2018 |

(Continued)

OTHER PUBLICATIONS

International Search Report and Written Opinion for PCT/US2019/025329 dated Aug. 5, 2019.

(Continued)

*Primary Examiner* — William A. Rivera
(74) *Attorney, Agent, or Firm* — Thompson Coburn LLP

(57) ABSTRACT

A control system for a converting line has a sensor configured to sense a distance between the sensor and a surface of a roll of web material as the roll of web material is unwound from an unwinder and directed to the converting line. The controller is configured to: (i) determine a diameter measurement of the roll as the roll rotates based upon the sensor signals; (ii) store a plurality of data structures in a memory of a controller of a control system wherein the data structures comprise a plurality of data items associated together as the diameter measurements of the roll of the web material; (iii) process by a statistical regression analysis the data structures associated with the diameter; and (iv) generate signals for controlling the converting line based upon the processed diameter measurements.

18 Claims, 13 Drawing Sheets

(56) References Cited

U.S. PATENT DOCUMENTS

| | | | |
|---|---|---|---|
| 9,951,472 B2 | 4/2018 | Bomstad et al. | |
| 9,963,827 B2 | 5/2018 | Bomstad et al. | |
| 10,119,225 B2 | 11/2018 | Bomstad et al. | |
| 10,214,857 B2 | 2/2019 | Bomstad et al. | |
| 2002/0123417 A1* | 9/2002 | Cote | B65H 23/048 493/34 |
| 2003/0150908 A1* | 8/2003 | Pokorny | G05B 13/0285 235/375 |
| 2006/0038051 A1* | 2/2006 | Betti | B65H 16/106 242/420.3 |
| 2008/0054120 A1 | 3/2008 | McNeil et al. | |
| 2008/0058980 A1* | 3/2008 | Nakano | B65H 20/16 700/122 |
| 2009/0303484 A1 | 12/2009 | Hofeldt et al. | |
| 2010/0305739 A1 | 12/2010 | DeBruler et al. | |
| 2011/0264254 A1* | 10/2011 | Nuyan | G05B 13/048 700/103 |
| 2011/0295429 A1* | 12/2011 | Schultze | B65H 23/188 700/275 |
| 2012/0126049 A1* | 5/2012 | Gruzdaitis | B65H 23/1955 242/412 |
| 2017/0327337 A1 | 11/2017 | Bixler et al. | |
| 2018/0332884 A1* | 11/2018 | Rosado | B65H 19/26 |
| 2019/0054677 A1* | 2/2019 | Schmitz | B29C 48/0018 |
| 2019/0301099 A1 | 10/2019 | Montagnani et al. | |
| 2020/0216281 A1* | 7/2020 | Raul | B65H 23/1888 |
| 2020/0385227 A1* | 12/2020 | Petras | B65H 18/26 |
| 2021/0114833 A1 | 4/2021 | Giurlani et al. | |

FOREIGN PATENT DOCUMENTS

| | | |
|---|---|---|
| WO | 2019185438 A1 | 10/2019 |
| WO | 2019244182 A1 | 12/2019 |
| WO | 2019244183 A1 | 12/2019 |

OTHER PUBLICATIONS

Palavesam et al., "Roll-to-roll processing of film substrates for nybrid integrated flexible electronics", Flex. Print. Electron. 3, Feb. 21, 2018, 014002. retrieved from <URL:https://iopscience.iop.org/article10.1088/2058-8585/aaaa04/pdf>.

* cited by examiner

| Data No. | Parent Roll ID | Parent Roll Diameter | Caliper | Rate of Change of Caliper | Rate of Change of Diameter | Type of Defect | Severity of Defect |
|---|---|---|---|---|---|---|---|
| 1 | 10010 | 36.200 | .007 | 0.4% | 0.2% | 0 | 0 |
| 2 | 10010 | 36.100 | .008 | 0.8% | 0.4% | 0 | 0 |
| 3 | 10010 | 36.000 | .009 | 0.5% | 0.6% | 0 | 0 |
| 4 | 10010 | 35.900 | .007 | 0.4% | 0.7% | 1 | 1 |
| ... | ... | ... | ... | ... | ... | ... | ... |
| n | 10010 | 35.800 | .006 | 0.5% | 0.3% | 0 | 0 |

Fig. 3

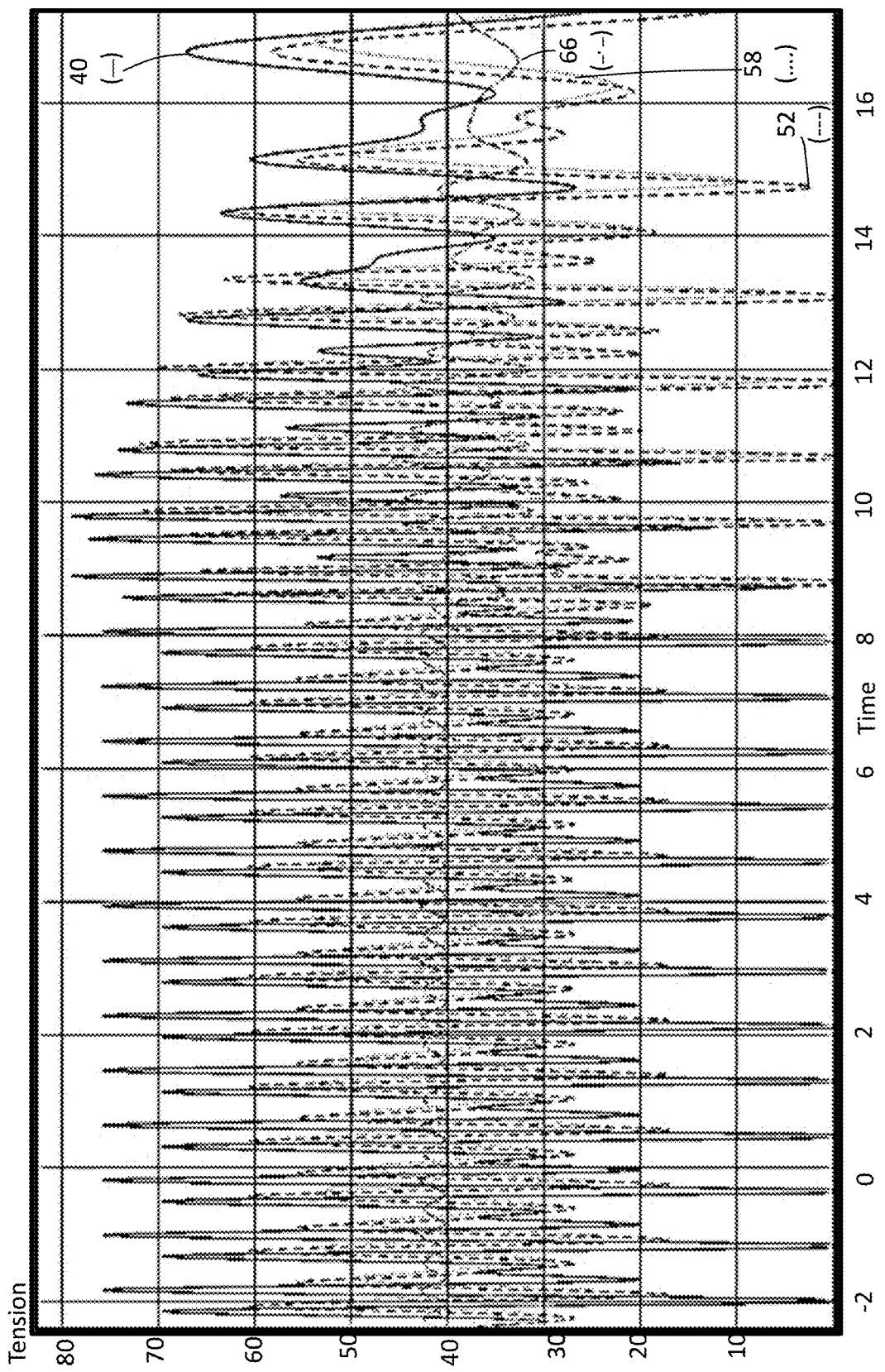

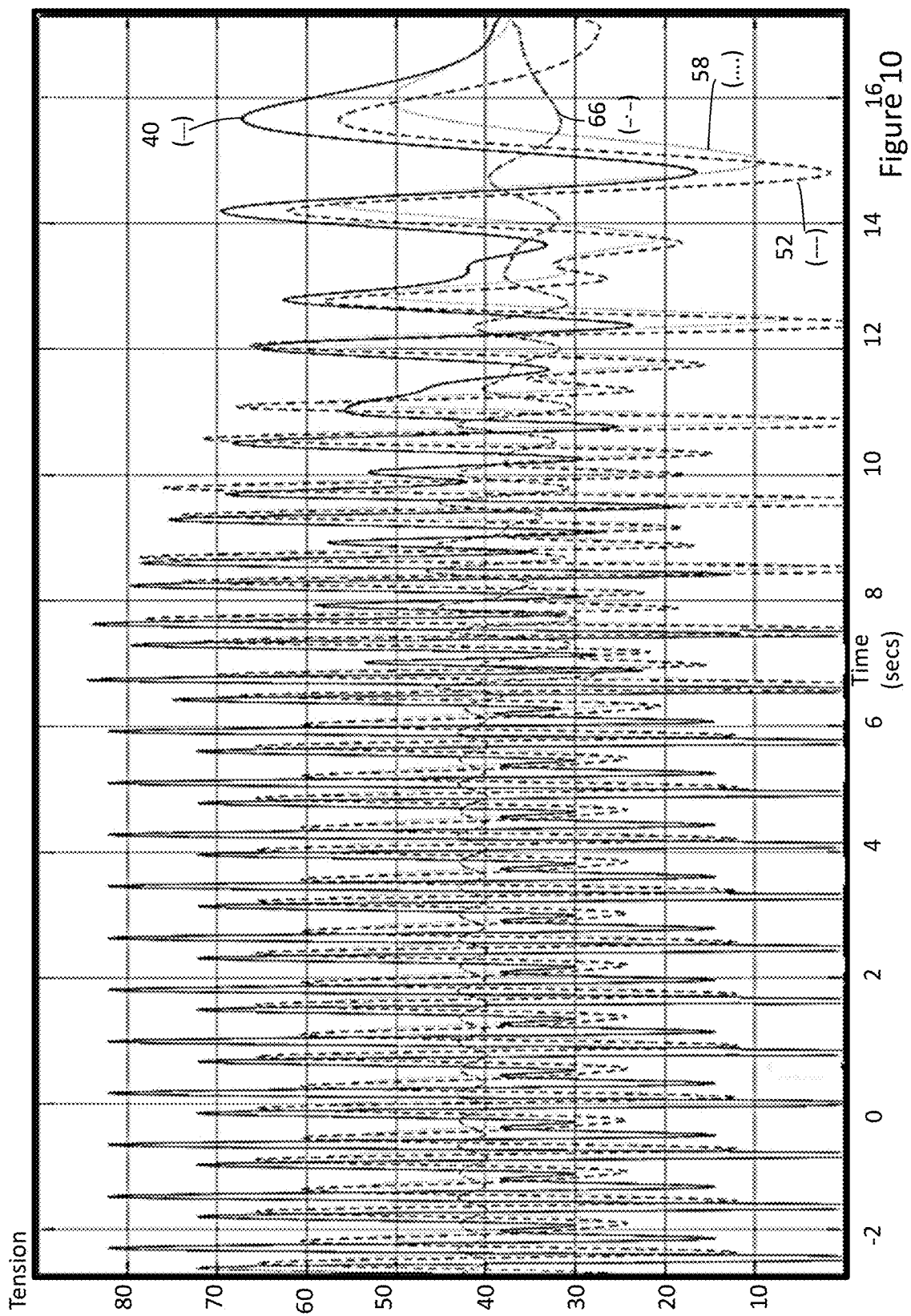

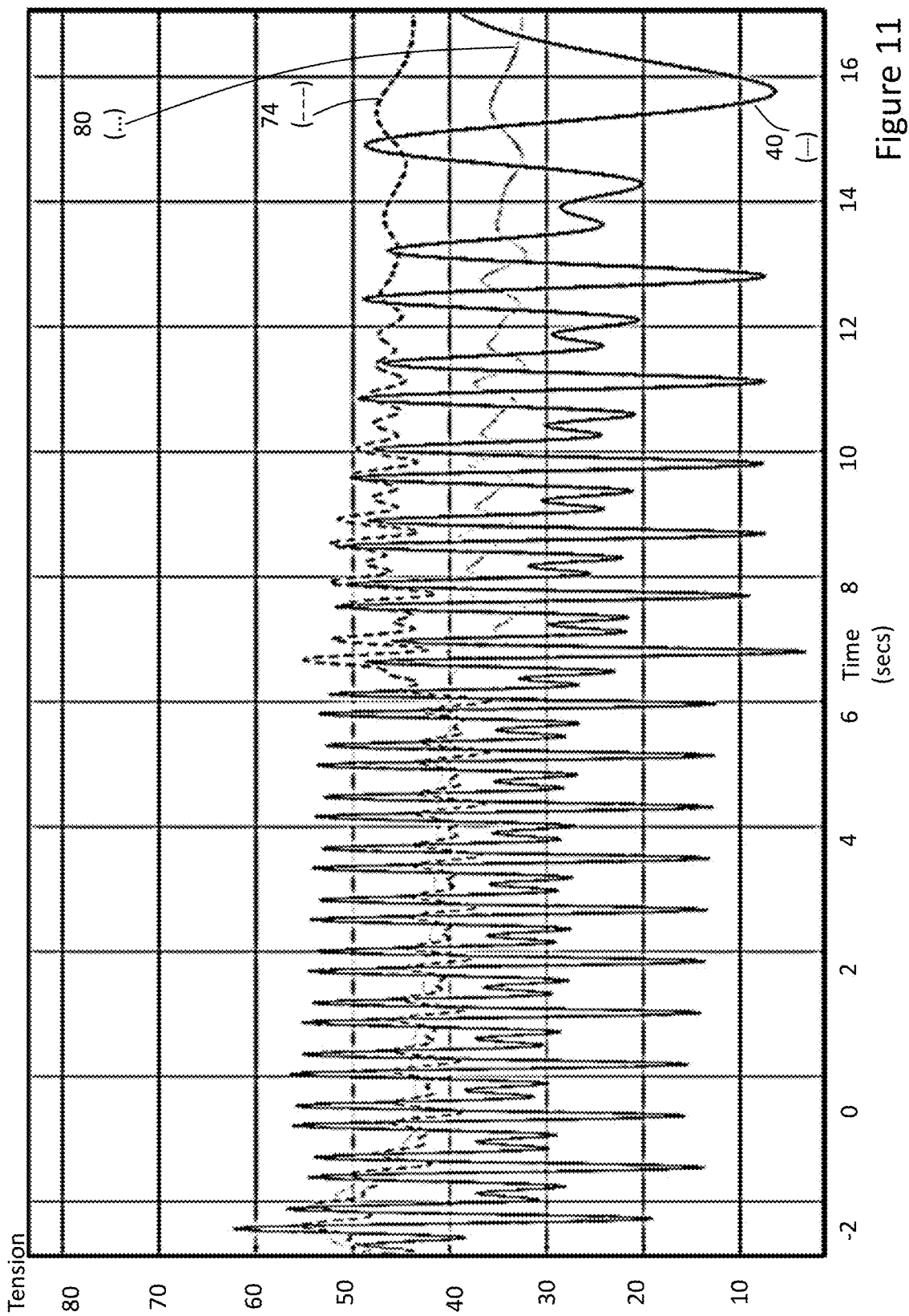

CONTROL FOR PARENT ROLL UNWINDING APPARATUS AND METHODS

RELATED APPLICATION DATA

This application claims the benefit of U.S. provisional application Ser. No. 62/652,499, filed Apr. 4, 2018, the disclosure of which is incorporated by reference herein.

BACKGROUND

Disclosed in more detail below is a control for a converting line. More in particular, the disclosure is directed to aspects of a control for unwinding the parent roll and directing unwound web material to the converting line for additional processing, and aspects of a control for controlling a driven roll in the converting line based upon tension sensed downstream of the driven roll.

In one aspect, the disclosure is directed to a method and apparatus for estimating diameter and caliper of a web formed of one or more plies from an unwinding parent roll. In another aspect, the disclosure is directed to a method and apparatus for web handling and converting line control based upon the estimates of parent roll diameter and unwinding web caliper. In another aspect, the disclosure is directed to a method and apparatus for web handling and converting line control based upon tension sensed downstream of the driven rolls.

As will become evident from the discussion that follows, the systems and methods described herein allow converting machinery to be less complex to operate, reduce new converting line commissioning time, simplify product change-overs, maximize uptime, and reduce cost. The systems and methods described herein seek to limit the effects of variability in substrate as it pertains to downstream processes, thereby allowing for optimizing uptime and minimizing operating intervention while increasing processing speeds.

The systems and methods disclosed herein allow for accurately driving and optimize the timing of events in the unwind cycle that are dictated by unwind diameter or web position in the roll. One direct example of such optimization is a parent roll splice event. In order for the transients caused by such an event to be minimized, one must know the rate of change of diameter as it pertains to web output in order to predict pre-trigger events like line deceleration given variable running speeds. There are also many measurements and events recorded during the roll manufacturing that could be used to optimize the converting process if decoded accurately by diameter.

Conventionally, these variabilities are manually handled by operators of the equipment. Oftentimes, on the fly adjustments are made as the operator observes the process, or pre-programmed adjustments are made based on assumed criteria such as parent roll diameter. Generally, these methods all detract from overall machine efficiency because they either require operator time and interaction, or the adjustments are based on general assumptions, which may be inapplicable for a particular condition.

Using the systems and methods described herein, there may be opportunities to capture data for enhanced converting line performance, production, and/or raw material utilization. Rather than developing new controls and measurement techniques, the disclosure herein describes the use of existing or conventional converting line sensors to provide more accurate feedback and adaptive controls that may reduce operator interactions and other inefficiencies when using preset conditions guided by general assumptions.

DESCRIPTION OF THE DRAWINGS

FIG. 3 is a schematic diagram of a database structure associated with the parent roll.

FIG. 8 is a plot showing the differences in relative tension (y axis) in the web over time (x axis) for certain web handling elements shown in FIG. 4.

FIG. 10 is a plot showing the differences in relative tension (y axis) in the web over time (x axis) for certain web handling elements shown in FIG. 4 with a web having a 15% higher modulus of elasticity than the web shown in FIG. 8.

FIG. 11 is a plot showing the differences in relative tension (y axis) in the web over time (x axis) for certain web handling elements shown in FIG. 6 with a web having a 15% higher modulus of elasticity than the web shown in FIG. 9.

DETAILED DESCRIPTION

As will be discussed in greater detail below, parent roll diameter and web caliper may be used to optimize process set points in the converting processing line, for instance, nip, tension and log firmness in rewinding equipment. The rate of change or percentage of change of web caliper may also be used to fine tune parameters, optimize the operating speed of the equipment, and minimize waste. Additionally, rate of change of diameter of the parent roll in addition to web caliper may be used to predict and prepare for upcoming events like marked splices.

Figure 1:
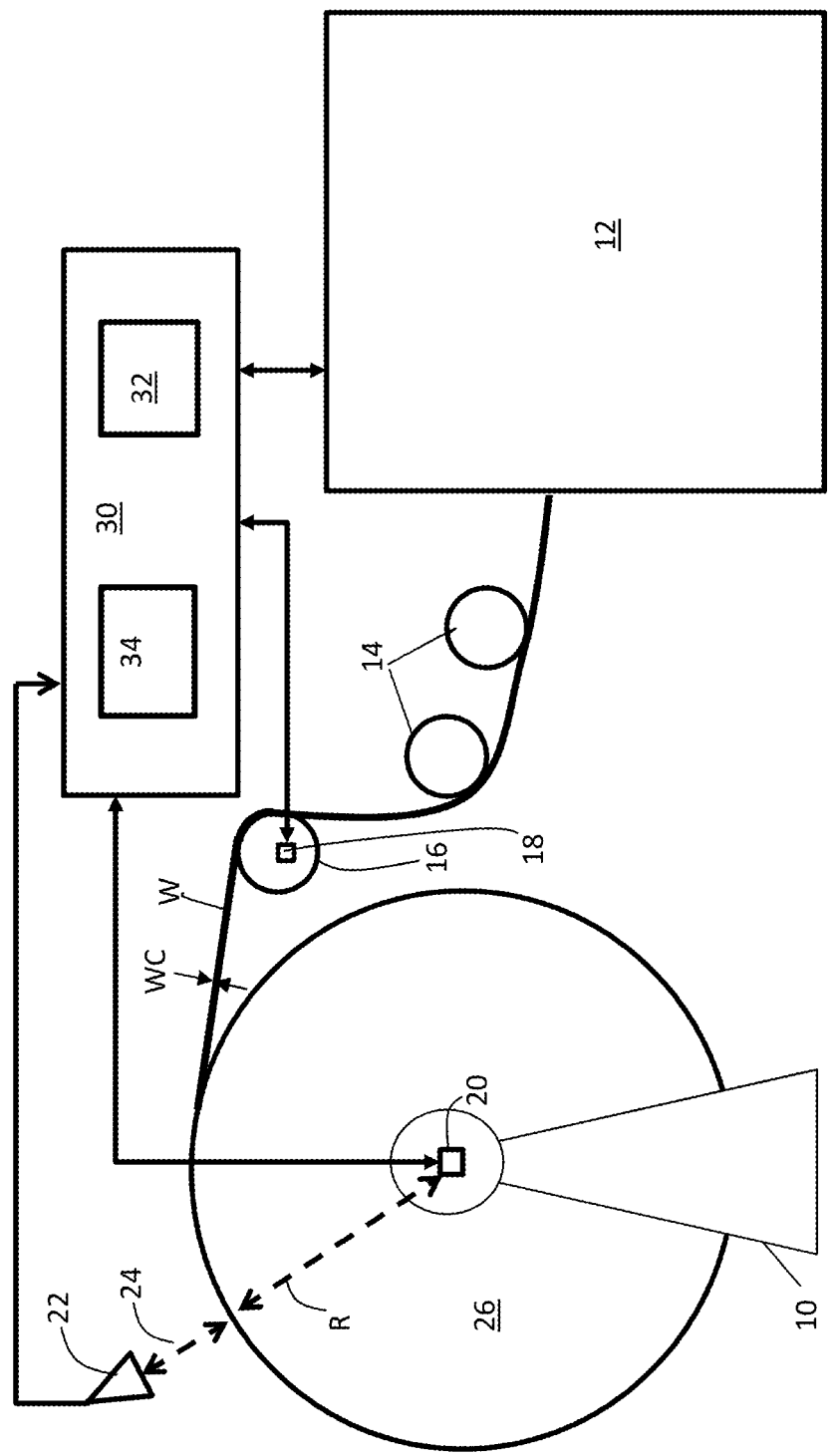
FIG. 1 is a schematic diagram of an exemplary unwinder unwinding a web from a parent roll for processing in a converting line and a sensor associated with the unwinder, a database receiving a signal from the sensor associated with the unwinder and signals from sensors associated with the converting line, and a controller controlling operation of the converting line, the unwinder and web handling equipment between the unwinder and the converting line.

Referring to FIG. 1, a center driven unwinder 10 delivers a web of material W to other equipment 12 in the converting line through web handling rolls 14, which may include one or more rolls 16 with associated drives 18. The unwinder 10 has a drive 20 and at least one sensor 22 positioned relative to the unwinder to measure distance 24 between the sensor and a parent roll 26 loaded in the unwinder. A controller 30 controlling operation of the converting line and a database 32 accessible by the controller is provided. The center driven unwinder 10 may utilize existing diameter sensors 22 to develop diameter and caliper measurements during the unwind process. For instance, the sensors 22 may use laser time-of-flight technology to calculate the distance 24 from the sensor to the surface of the parent roll 26, thereby effectively measuring the radius R of the parent roll, and after successive revolutions, measuring the difference in radius of the parent roll to estimate sheet caliper WC. One sensor currently in use is a Banner LTF12UC2LDQ. Such a sensor has proven satisfactory to measure parent roll radius R during unwinding and provide an estimation of caliper WC.

Figure 2:
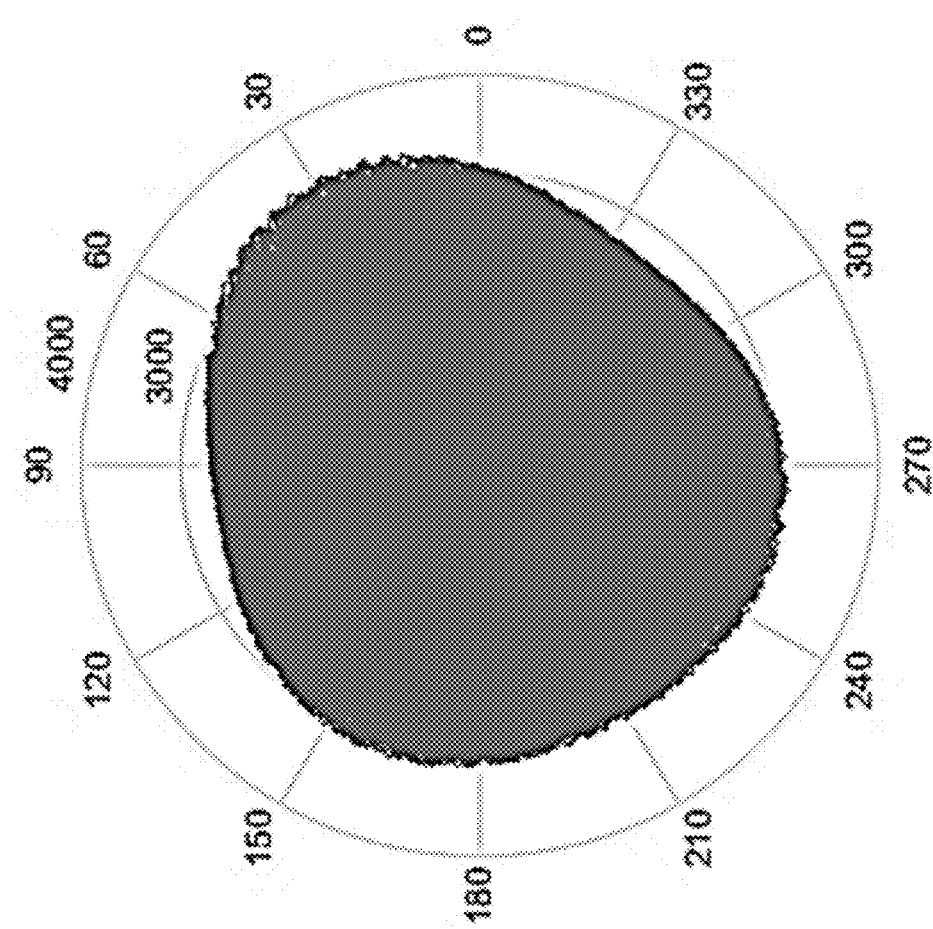
FIG. 2 is a schematic diagram of a signature of a parent roll with an out-of-round condition and associated sensor noise.

A typical parent roll signature is shown in FIG. 2 along with sensor noise. Because the measured surface of the parent roll is typically not uniformly round, the measurement comprising the difference in parent roll radius R or the caliper WC estimate may be subjected to a square root least squares regression model in the form of $\sqrt{bx+C}$. The measurements of parent roll radius R may be sampled continuously from multiple sensors 22 located about the parent roll 26 during the unwind process. The data may be collected continuously and transmitted to a processor 34 of the controller 30 of the converting line. The processor 34 may access the database 32 to store data representative of diameter and caliper in the database. The processor 34 may be further configured to perform regression analysis on the data. For instance, the processor may use a regression model that may continuously update the coefficient (b) and constant (C) as a function of the amount of web material delivered from the unwinder 10. The data to be analyzed may be stored in a first in first out (FIFO) database stack, allowing for a continuously adapting fit of the recent history of the running parent roll. It is known that the caliper WC of the web material W of the parent roll changes throughout the parent roll and is not consistent throughout the parent roll. Generally speaking, changes in the caliper of the web material typically occur gradually due to the nature of the substrate manufacturing process and rewinding process. With this in mind, for a particular substrate and converting process, the size of the FIFO database stack and sample interval may be adjusted as necessary taking into account also the accuracy of the sensor(s) 22 and the need to identify the data signifying a change of the caliper WC. The sample interval may also be randomized within a range so as to minimize the potential of sample aliasing of the non-uniform shape of the parent roll. A digital filter may also be employed to remove out of band noise from any signals prior to generating the data stored in the FIFO database. Once the data is fit, the derivative of the regression equation can be evaluated.

It has been determined that an adequate function for the regression analysis is $b/2\sqrt{bx+C}$. The method has been proven useful in describing the rate of change of diameter (2×R) per amount of web delivered. At a given location on the circumference of the parent roll 26, the change in diameter (A(2×R)) in one revolution of the parent roll effectively equates to two times the caliper at unwinding. The final form leverages the regression value for diameter at the discrete time of sampling such that $$\text{caliper} = \frac{\left(\frac{b}{2\sqrt{bx+C}}\right)\left(\pi\sqrt{bx+C}\right)}{2}$$

which simplifies to $$\frac{\pi b}{4}.$$

The above analysis to develop estimates of caliper WC during sampling intervals during the unwind process may be utilized in several ways to enhance the converting process. Diameter (2×R) and caliper WC data may be used by the control to effectuate real-time control of downstream equipment in the converting line, such as a rewinder. Generally speaking, large diameter parent rolls of structured web material exhibit decreasing unwinding caliper and higher in-wound stress during unwinding. As the finished diameter of a structured sheet parent roll 16 increases, the winding profile and the effects of overwrapped sheets and roll weight have an increasing effect on the inner wound properties and subsequently how the unwound web material behaves through the converting processes. By monitoring for changes in caliper WC and diameter (2×R) as the parent roll unwinds, the downstream web handling and processing equipment may be adjusted as needed to enhance line efficiency. As will be discussed in greater detail below, the tension of the web (e.g., between rollers and load cells) may be trimmed accurately in view of a given web condition. Other processes involving lamination and/or embossing equipment may be more tightly controlled, for instance, web speeds, nips pressure and spacing, embossing roll speed and adhesive application. Converting processes may also be automatically adjusted to maximize machine throughput. Some specific examples of potential adjustments include increasing the embossing level, decreasing the applicator to steel roll gap, relaxing the web more as the roll unwinds (profiled unwinding/traversal tensions based on unwinding caliper trend versus diameter) and various rewinder adjustments to maximize wound bulk, for instance, lower roll speed offset.

Additionally, diameter (2×R) and unwinding caliper WC measurements may be correlated to processing information associated with the winding of the parent roll to increase the effectiveness of the controller 30. For instance, defects detected during the process of forming the parent roll 26, for instance, during the winding process or during the production of the web W which is wound to form the parent roll, may be tracked relative to diameter (2×R) and caliper WC during winding of the parent roll. The data may be collected and maintained with the parent roll 26. The data may be representative of parent roll production parameters, such as process time, amount of web material wound, caliper, diameter, the nature of the defect, location of the defect, size of the defect (in terms of a dimension in a direction of the web movement and a dimension in a direction transverse to the web movement), and/or severity of the defect. An example of parent roll data which may be stored with the parent roll 26 and uploaded to the database 32 is shown in FIG. 3. This roll specific data representative of the manufacturing and upstream winding of the parent roll 26 prior to delivery to the converting line may also be uploaded into the database 32 and correlated with the unwinding process parameters. When the parent roll 26 is queued for use in a converting process, the parent roll production data may be uploaded to the database 32 associated with the unwinder and converting equipment. The roll specific data associated with the manufacturing and/or winding of the parent roll (prior to unwinding) may be synchronized with the diameter (2R) and caliper WC measurements during the unwinding process to maximize the effectiveness of the controls for the converting line. Thus, the relative condition of the web as it unwound can be predicted based upon measurements of diameter, caliper and change in caliper during the unwind process, and appropriate proactive action can be effected through the controller to control converting equipment and the unwinder, as necessary. For instance, a certain known defect in the parent roll production occurring at a specific time, diameter, or caliper, can be tracked relative to the unwind process so that the converting line equipment and unwinder may be operated in a manner to minimize the effects of the defect. The measurement of diameter, caliper and rate of change of caliper during the unwind process can be used to predict such defects in the parent roll. As a further example, in a rewinder operation, as the bulk or modulus of the wound log changes, the controls of the converting line may be configured to change converting line handling processes to maintain a more stable operation. The roll specific data and/or data representative of process parameters including diameter and caliper may indicate with probability the existence of a defect in the unwound web of the parent. Depending upon the severity of the defect, the control may be configured to control operation of the converting line accordingly. For instance, for a severe defect, the control may control the converting line to decrease running speed automatically and then resume speed once the defect condition passes. This might reduce the potential for web break events associated with known defects, thereby reducing waste.

Additionally, having accurate information of the winding of the original parent roll allows the converting line controls to more accurately estimate processing events as the parent roll unwinds, including time before roll splice. An automated control may allow the machine to automatically splice over to a new parent roll, thereby eliminating or reducing the requirements for a line operator to manually to perform operations associated with splicing.

Many converting line process events are based on the unwind roll diameter. For instance, web splicing of expired unwind rolls with new unwind rolls includes several events that must be timed and staged in order to maximize the efficiency. Movement of the splice mechanism into a preferred splice position just prior to splicing allows for reliability of the splicing sequence and maintains ease of operation. The splice event requires accurate measurements of roll diameter where the splicing occurs at a known or preset diameter of the unwinding roll. Estimating unwinding caliper using the methodology described above provides consistent accurate estimates of roll diameter. Thus, the unwind process may allow for the parent roll to be consistently unwound to a level that minimizes spent roll waste, and allows for less variability and thus easier handling of spent rolls.

Further, accurate estimation of time prior to processing events is useful in simplifying the operator experience. The accurate estimation of time prior to processing events provides for generation of a prioritized task list of upcoming critical processing events that will require operator intervention or attention. With an accurate estimate of the rate of diameter reduction of the parent roll during the unwind process, amount of web material unwound, a valid estimate of time to an event, for instance, a splice/expired roll removal event, can be provided to a priority estimation system.

Further, accurate estimation of unwinding caliper and unwinding caliper changes can be related to effective changes in wound log in-wound compression, which allows for relating a relative change in firmness of the finished log as the input material changes. Parameters such as unwinding caliper, unwinding caliper changes, rewinder wound log in-wound compression, and estimated rewinder log firmness can be tracked and transmitted to downstream processes such as tail sealing (roll height adjustments), saw cutting (clamps), and packaging equipment to proactively adjust for incoming product changes thereby maximizing efficiency of the converting line and optimizing product quality.

Tracking the general trend of roll unwinding caliper versus diameter provides insight into the raw material, the winding process to produce the parent roll, and how the parent roll will behave in the converting process. It may be desirable to track such information over time by parent roll product part number or SKU, and monitor for parent rolls that exceed a band of historical data. Such information could result in a proactive alert for operator action, or automatic converting line controller action for instance, reducing speed, reducing line tension, nip adjustment, etc. Such information may also be used to associate unwinding characteristics with net converting line machine performance and other parameter adjustments to generate machine learning data sets and adaptive controls to further automate converting line controller action. Accordingly, the parent roll diameter and caliper may be measured when a defect is detected in the web from downstream equipment in the converting line, e.g., a machine vision system associated with the rewinder. The nature of the defect and other desirable process measurements may be captured and stored in a database to form a defect database, such as that mentioned earlier and by way of example as shown in FIG. 3. The parent roll manufacturing history including its wind history may be accessed from the parent roll supplier and correlated to the unwind history and defect database. The controller for the converting process may be configured to make adjustments to the converting line equipment based upon the data in the defect database.

As a further example, accurate estimation of diameter, unwinding caliper and unwinding caliper changes can be used in connection with controls for downstream web handling equipment including the successive rolls involved in directing the unwinding web to a rewinder. As will be described below in greater detail, accurate estimation of diameter, unwinding caliper and unwinding caliper changes can be used to reduce problems in web handling, maintaining web stability, and minimizing web stress as the web is unwound and conveyed. Popular web manufacturing processes such as TAD, NTT, QRT, and other structured or textured formats are exceptionally sensitive to not only peak stress, but duration of stress—often more so than webs produced with conventional dry crepe manufacturing processes. Any increase in web stress is generally detrimental to the behavior in downstream processes such as rewinding, and, therefore, it is desirable to minimize the stress applied to the web.

Figure 4:
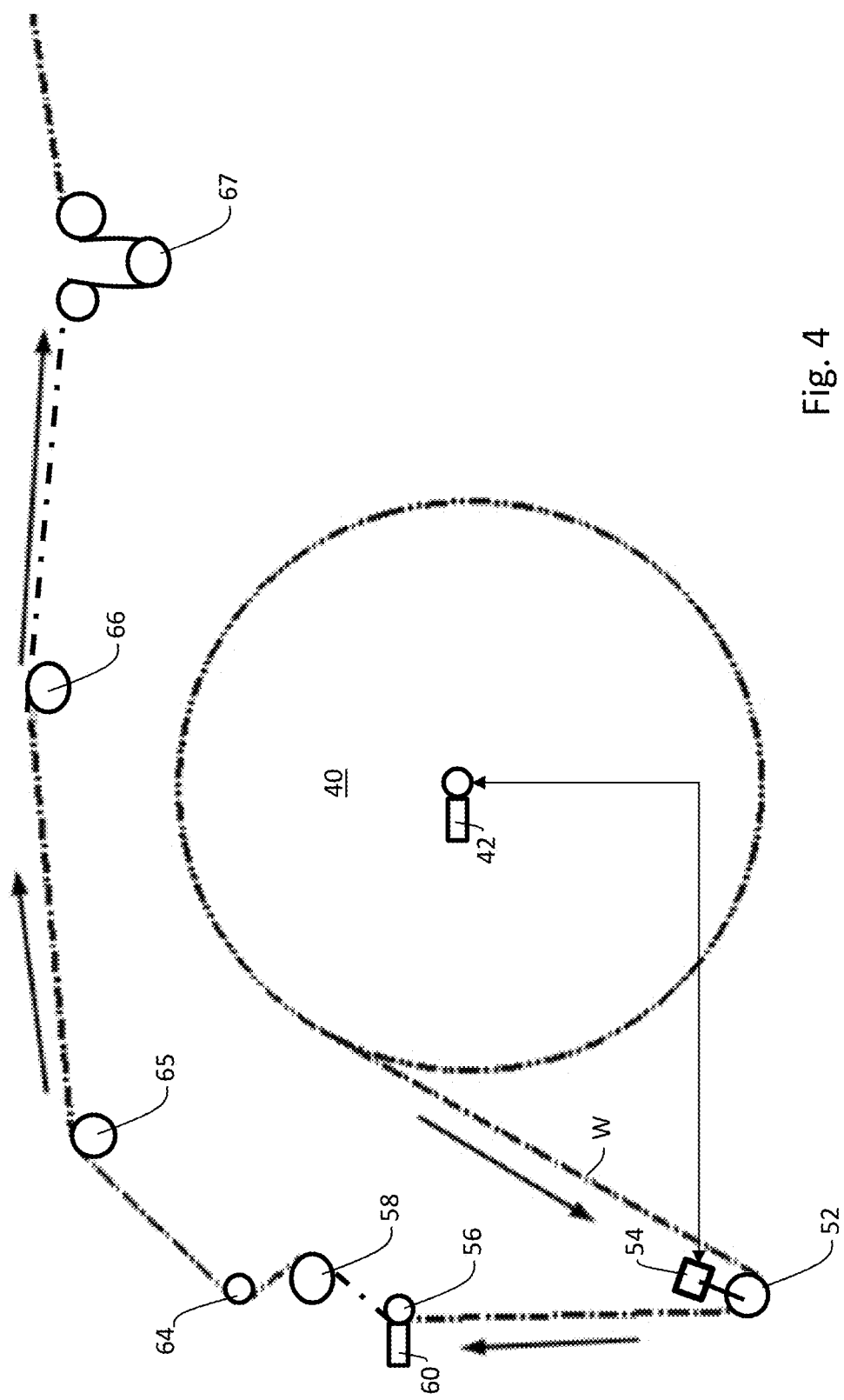
FIG. 4 is a schematic diagram of an unwinder unwinding a web from a parent roll and passing the web through web handling equipment prior to other equipment in the converting line with a conventional control configuration.
Figure 5A:
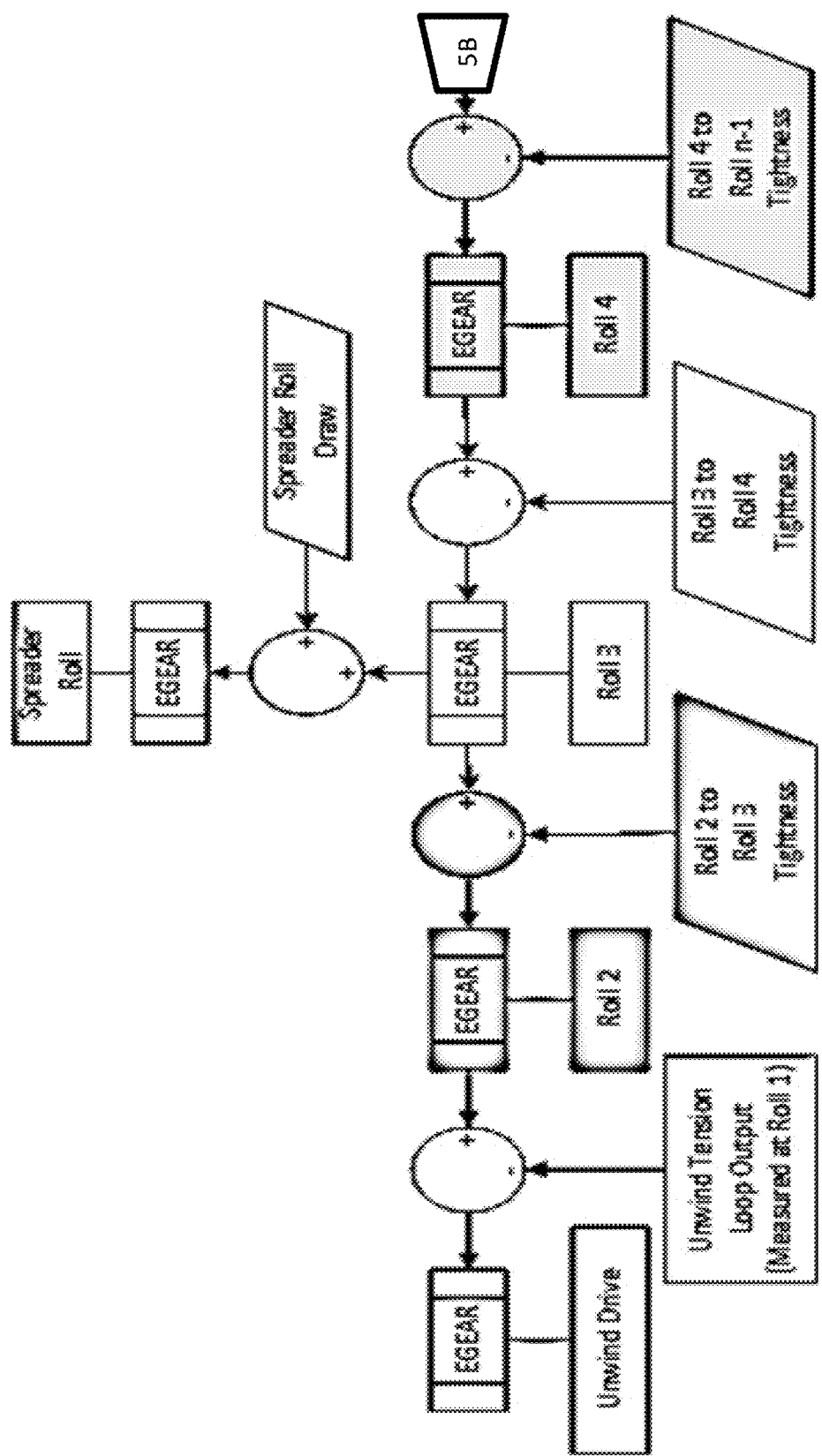
FIGS. 5A and 5B are schematic diagrams of a conventional control configuration for web handling equipment between an unwinder and other equipment in the converting line as shown in FIG. 4.
Figure 5B:
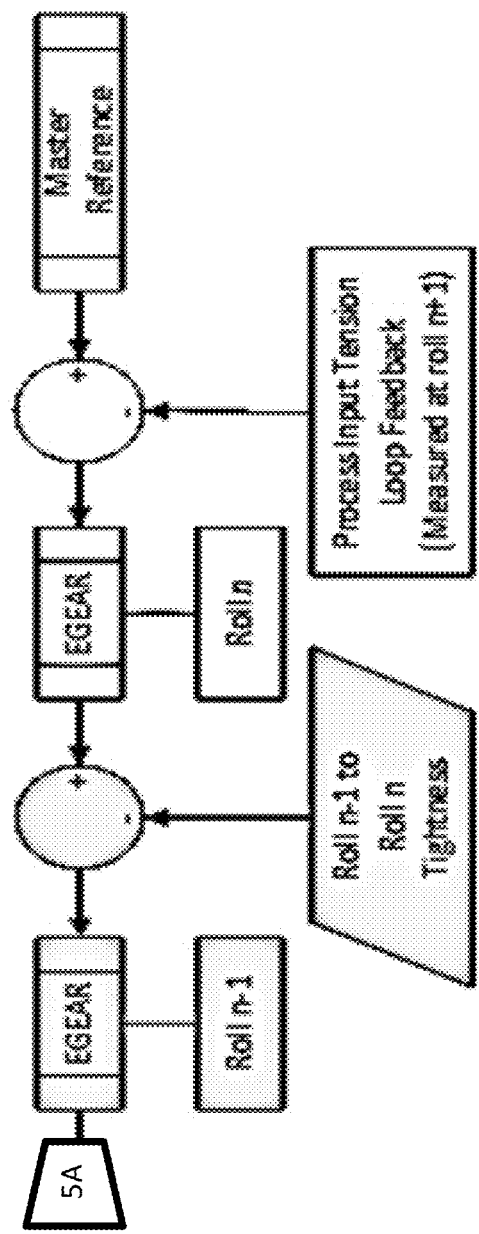

FIG. 4 shows a conventional configuration of web handling equipment between the unwinder and the converting line, and FIGS. 5A and 5B show a typical control for the conventional configuration of FIG. 4. In conventional configuration, the parent roll 40 is driven with a drive 42, and the unwinding web W will pass from the parent roll 40 to a first downstream roll 52 with a load cell 54 and then to a second roll 56 and a third roll 58. The second roll 56 may be a driven roll with a drive 60. In the conventional configuration, the unwinder drive 42 is trimmed by tension feedback generated by the load cell 54 associated with the first downstream guide roll 52, or located at another location between the unwinder payoff point and the first downstream guide roll. Typically, there may also be another tension control zone trimmed by roll n, measured at roll n+1. The speed reference for all rolls is a common master reference with a trim offset for each roll to account for the relative spans between the rolls. These speed trim offsets may or may not cascade from roll to roll. In situations where a speed offset does not cascade, the adjustment will affect multiple spans. In situations where an adjustment cascades (back towards the unwinding parent roll in this scenario), the adjustment will maintain the same relative speed differential in the spans behind the adjustment. For instance, the payoff web tension may be measured by the load cell associated with roll 1. The web tension may be controlled by changing the speed of the driven parent roll. This loop attempts to control the tension in the span between the parent roll payoff point and the first driven roll 52. Downstream of the second downstream guide roll 56 can be a number of idling and driven web handling elements 64, 65, 66, 67.

In this conventional configuration of FIGS. 4 and 5A and 5B, the perturbations introduced by non-uniformities in the parent roll radius (out-of-roundness) not only result in local disturbances in the span between the parent roll and the first downstream guide roll 52 and between the first downstream guide roll and the second downstream guide roll 56, but, as the web travels downstream, these disturbances set up conditions that create even greater instabilities. For instance, each span of web and associated rollers can enter resonance and eventually a state of stick-slip oscillation as the conveyed web stress crosses various thresholds. The net result of this scenario is an unstable web that has very high peak stress with behavior that is highly variable based on web modulus, strain recovery rate, coefficient of friction of substrate on web elements, running tension, speed, etc.

A conventional closed loop tension feedback scheme such as that shown in FIGS. 5A and 5B tends to be insufficient. Maintaining response stability under changing input conditions generally results in an under-tuned system which further exacerbates the problem. In such a system, web spans may experience significant swings in tension, for example, on one extreme the load cell will measure no load as the load cell roll loses wrap/contact with the web and another extreme where the web tension is above the maximum threshold measurable by the load cell. If not properly tuned, closed loop tension feedback schemes can contribute to the peak stresses and lack of general controllability. If a dancer is used in place of a load cell, the frequency of the disturbance will increase as web speed increases, and, at some point, the dancer will effectively lose the ability to provide useful feedback. In conventional systems to counter this behavior, the control may be configured to increase the tension in the web as it is conveyed such that the troughs of web stress do not dip below the minimum amount required for maintaining traction on the rotating web elements. This results in significant web conveyance stresses and sheet degradation.

Figure 6:
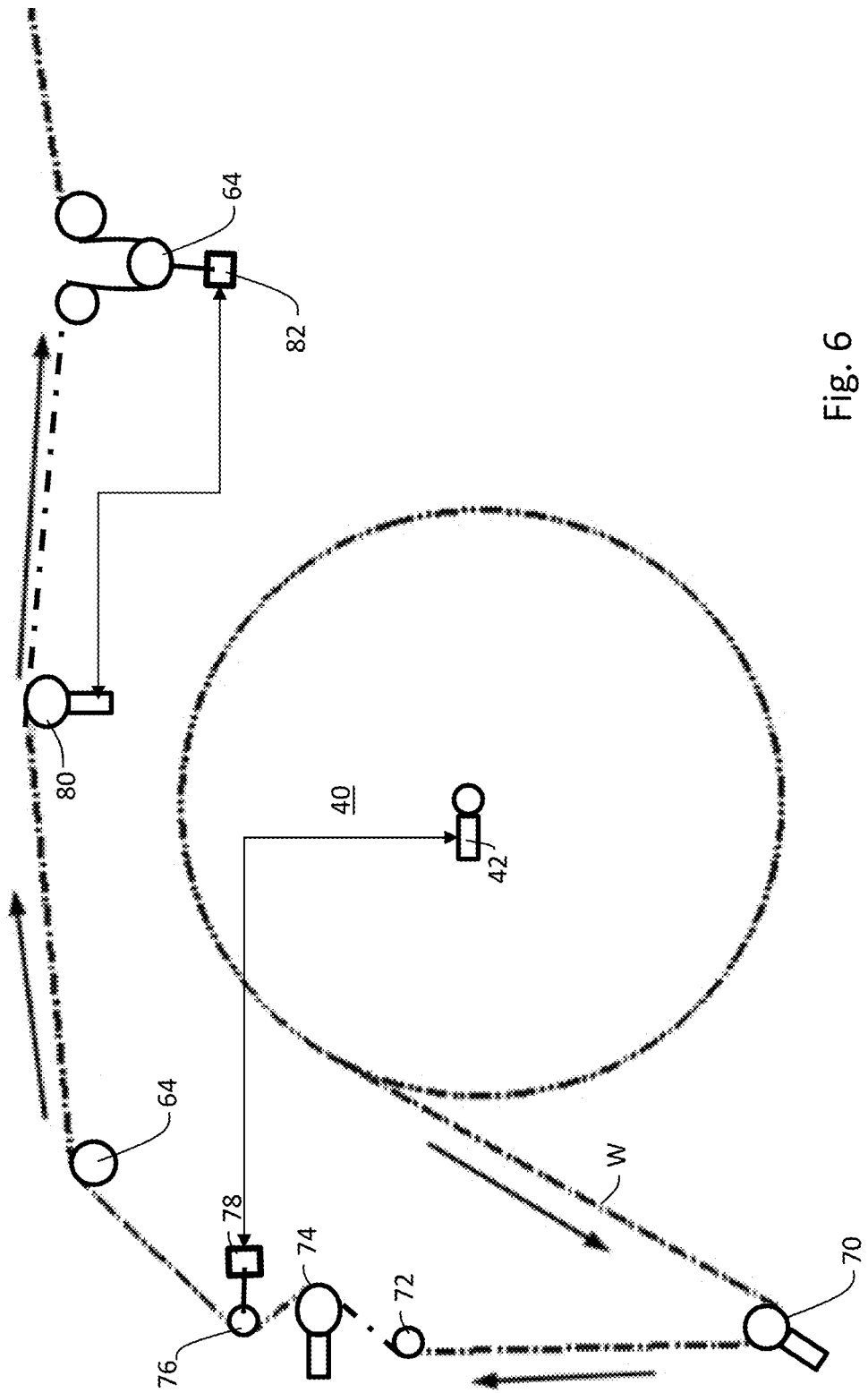
FIG. 6 is a schematic diagram of an unwinder unwinding a web from a parent roll and passing the web through web handling equipment prior to other equipment in the converting line with a modified control configuration.
Figure 7A:
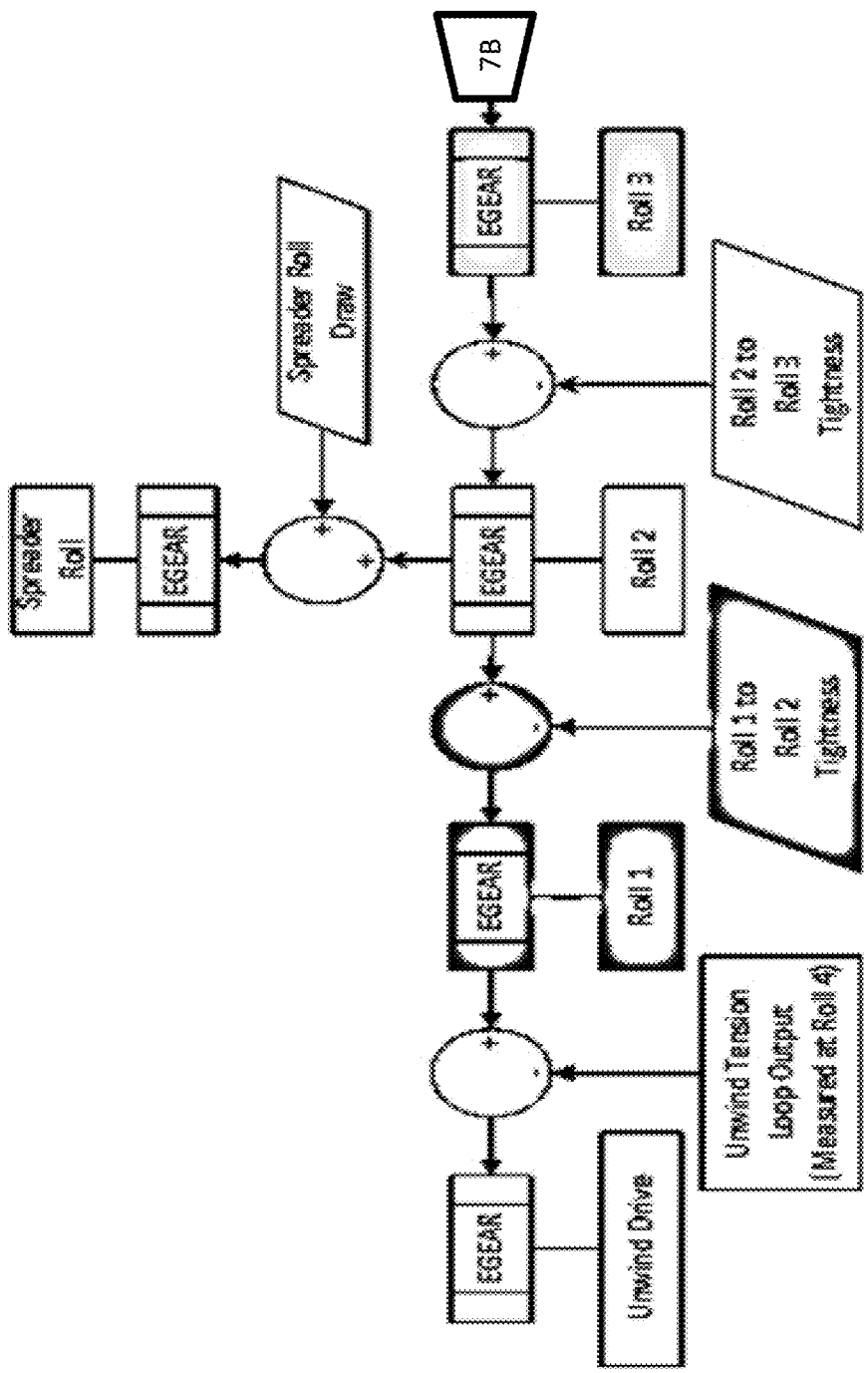
FIGS. 7A and 7B are schematic diagrams of a modified control configuration for web handling equipment between an unwinder and other equipment in the converting line as shown in FIG. 6.
Figure 7B:
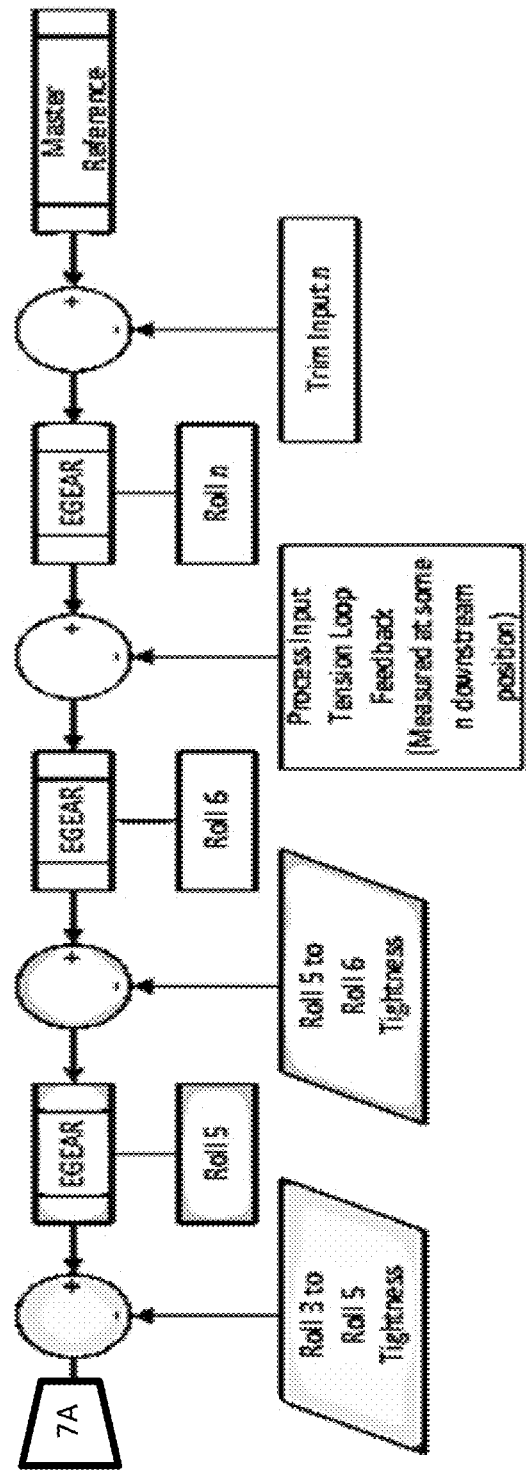

FIG. 6 shows a modified configuration of web handling equipment between the unwinder and the converting line, and FIGS. 7A and 7B show a control for the modified configuration of FIG. 6. In a modified configuration, disturbances introduced at the unwinder payout point from the parent roll may be reduced and attenuated to prevent downstream propagation, which thus improves the converting processing line machine efficiency, maintains more of the web's native characteristics, and improves finished product quality. Some measurable characteristics include: sheet tension and caliper, and wound product characteristics some of which influence ultimate wind speed.

Referring to FIG. 6, in the modified configuration, the first downstream roll 70 is arranged as a driven, high traction roll, and is followed by second, third and fourth downstream rolls 72, 74, 76. The high traction of the roll can be provided by, for example, a tungsten carbide coating, a plasma coating, or a covering of safety walk tape. Coatings are available from, for example, Praxair, Racine Flame Spray, and American Roller. Safety walk tape is available from, for example, 3M. The first downstream roll 70 may be configured to operate to balance the outgoing web velocity and upstream span strain. One embodiment of the controller may be to configure the controller with a control loop for the first downstream roll 70 that subtracts baseline components (losses, acceleration torque) and operates at a target output of torque that relates directly to force imparted on the web W. The first downstream roll 70 may be configured to maintain a standard velocity/position loop configuration to generate the baseline command for the target torque output with the above loop trimming that to achieve the desired web force while damping the relative band of velocity trim based on the sheet modulus and tensile properties. The unwind drive 42 may be trimmed by tension feedback located on a load cell 78 downstream from the unwinding process, for instance, adjacent to the fourth downstream roll 76. There may be another tension control zone trimmed by the sixth downstream roll 80, or another further downstream roll. The feedback tension load cell 82 may be located a number of rolls downstream. In another embodiment of the controller, the controller may use the hardware's native loops and be configured to use appropriate feedforward signals to compensate for roll inertia and commanded dynamics. The velocity (and optionally position) loops may be (de)tuned to be behave as over-damped, which may prevent the driven roll 1 from exciting secondary resonances and high peak stress (rapid torque rise) while still providing a more uniform web payout.

In the modified scheme, after the first downstream drive roll 70, depending on application requirements, a load cell roll or other web handling elements may be placed 64. As shown in FIG. 6, the modified configuration may provide for the third downstream roll 74 to be a second driven roll, and may provide for the second downstream roll 72 to be a spreader roll. The second driven roll and the spreader roll may be provided upstream and prior to the load cell roll, which may be the fourth downstream roll 76. The effect of the spreader roll 72 will be optimized due to an already damped web span—this allows for consistent roll contact and a more uniform strain in the sheet as it traverses the roll. By the time the web reaches the fourth downstream roll 76, the effect of the first downstream roll 70 normalizing velocity along with the web's natural viscoelasticity will significantly damp the disturbance in the web. This results in more stable and lower noise tension feedback. This signal may then be used to trim the unwind speed directly. All driven guide rolls 70, 74, 80 follow a nominal master speed reference, that is, they do not vary with the unwind tension feedback or, in the case of a center driven roll, the diameter feedback of the parent roll.

Figure 9:
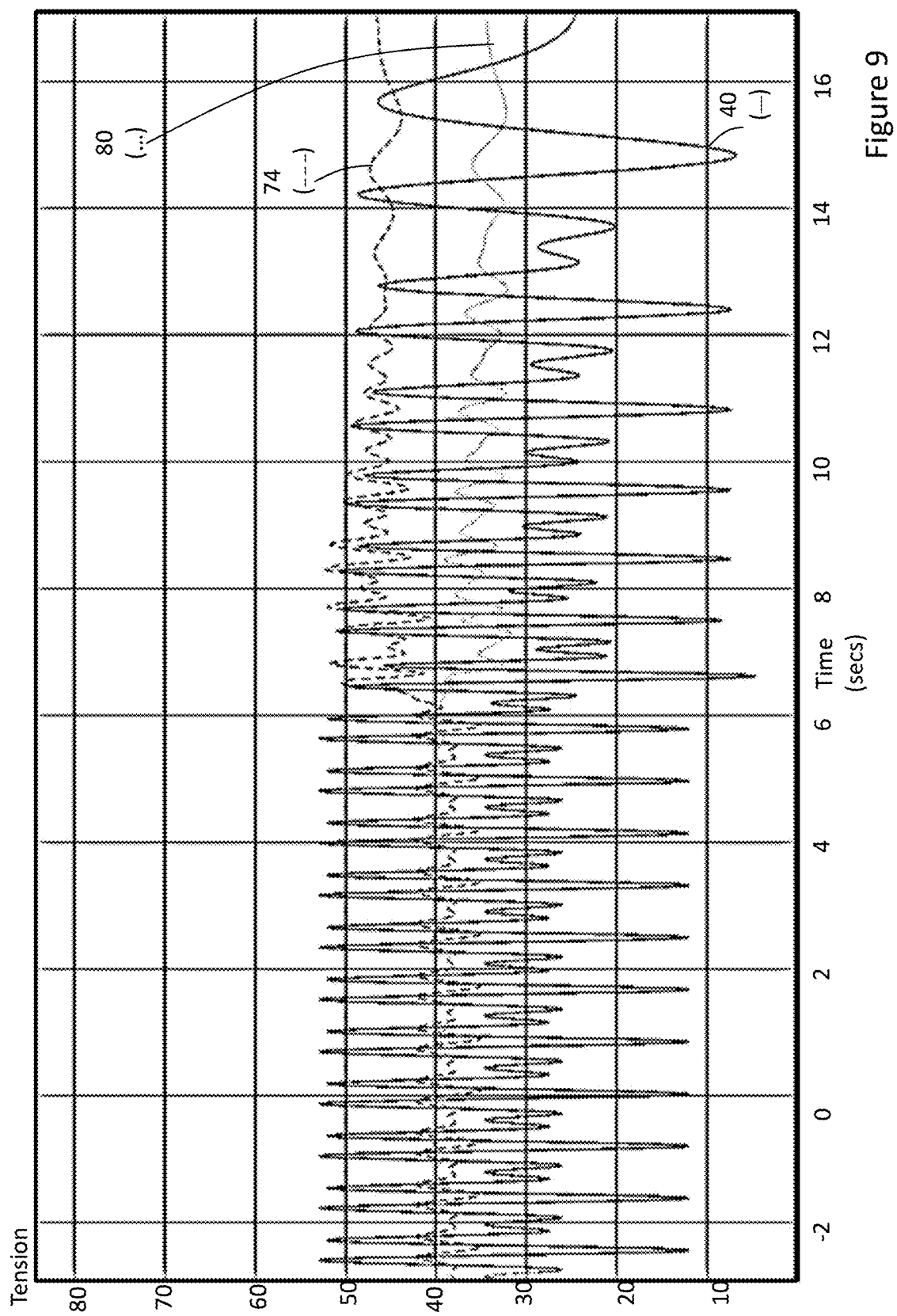
FIG. 9 is a plot showing the differences in relative tension (y axis) in the web over time (x axis) for certain web handling elements shown in FIG. 6.

FIGS. 8-11 show simulations of the conventional configuration (FIGS. 4, 5A, 5B) and the modified configuration (FIGS. 6, 7A, 7B). The components of the two configurations are identical with only the location of the load cell changed as described above, along with some slight damping of the response of the first driven roll after the unwind in the modified configuration. The parent roll is modeled with an "egg shaped" defect common with rolls stored on their sides and stacked for instance as shown in FIG. 2. The plot starts at a steady state condition running at 700 MPM and ends with a deceleration to a stop. The differences between the conventional and modified configuration are shown in the plots of FIGS. 8-11. In FIGS. 8 and 10, the plot shows tension (y axis) in relation to time (x axis) for the conventional configuration for the unwinder 40 (-), the first driven roll 52 (---), the third downstream roll 58 (****), and the sixth downstream roll 66 (-*-). In FIGS. 9 and 11, the plot shows tension (y axis) in relation to time (x axis) for the modified configuration for the unwinder 40 (-), the third downstream roll 74 (----), and the sixth downstream roll 80 (****). The initial web span in the conventional configuration runs (FIGS. 8 & 10) have higher peak to peak amplitudes than the modified configuration runs (FIGS. 9 &11), and the downstream spans in the conventional configuration runs (FIGS. 8 & 10) do not attenuate as quickly as in the modified configuration runs (FIGS. 9 & 11). There is also significantly more noise in the conventional configuration runs (FIGS. 8 & 10) during the deceleration as the roll velocities and web span tensions oscillate. The sensitivity to substrate variability is also illustrated by the second set of runs (FIGS. 10 and 11) where a single property (machine direction modulus of elasticity) was increased by 15%. Such a web being processed under the conventional configuration would experience difficulties during processing because of the high peak to peak amplitudes as shown in FIG. 10. FIG. 11 shows the same web being processed under the modified configuration, which shows a more nominal behavior.

The two examples above are illustrative of the generalized improvement that the modified scheme provides in the consistency, robustness, controllability, and reductions in peak web stress. These are critical requirements in effectively handling and preserving web when high speed and efficiency in converting are desired. The modified configuration provides a result where the sheet maintains more desirable qualities which facilitate downstream process efficiency and end product quality. The modified configuration process tends to be more robust from unwinding through downstream processes and reduces operator intervention. The improved control may also allow for reducing the complexity of downstream web handling equipment and controls, which could include longer spans, fewer driven guide rolls and fewer edge control implements.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A method of controlling a converting line, the method comprising:
   providing a sensor configured to sense a distance between the sensor and a surface of a roll of web material, the roll of the web material to be unwound from an unwinder and directed to the converting line;
   enabling the sensor to generate signals representative of the distance between the sensor and the roll as the roll rotates and the web material is unwound; wherein the roll of web material is non-uniformly round;
   determining diameter measurements of the roll as the roll rotates based upon the sensor signals, wherein the diameter measurements correspond to an amount of non-uniform roundness of the roll;
   storing a plurality of data structures in a memory of a controller of a control system of the converting line, the data structures comprising a plurality of data items associated together as the diameter measurements of the roll;
   with a processor associated with the controller of the control system of the converting line, processing by a statistical regression analysis the data structures associated with the diameter measurements; and
   enabling the controller to generate signals for controlling the converting line and the unwinder based upon the processed diameter measurements.

2. The method of claim 1 further comprising:
   determining an amount of the web material unwound from the roll based upon the processed diameter measurements.

3. The method of claim 2 wherein the step of enabling the control includes enabling the control to send signals to a graphic user interface associated with the converting line indicative of a time to unwind an amount of material from the roll.

4. The method of claim 2 wherein the step of enabling the control includes enabling the control to send signals to a graphic user interface associated with the converting line indicative of the amount of material to be unwound from the roll.

5. The method of claim 2 further comprising:
   correlating the diameter measurements and the amount of the web material unwound from the roll;
   structuring the plurality of data structures stored in the memory of the controller of the control system for the converting line with data representative of the amount of the web material unwound from the roll; and
   enabling the controller to generate signals for controlling the converting line based upon the processed diameter measurements and the amount of the web material unwound from the roll.

6. The method of claim 1 further comprising:
   determining a caliper measurement of the web based upon the processed diameter measurements for successive rotations of the roll as the web material is unwound from the roll.

7. The method of claim 6 further comprising:
   correlating the diameter measurements and the caliper measurements;
   structuring the plurality of data structures stored in the memory of the controller of the control system for the converting line with data representative of the caliper measurements of the web material;
   with the processor associated with the controller of the control system of the converting line, processing by a statistical regression analysis the data structures associated with the caliper measurements and the diameter measurements; and
   enabling the controller to generate signals for controlling the converting line based upon the processed diameter measurements and the processing caliper measurements.

8. The method of claim 1 wherein the step of storing the plurality of data structures in the memory of the controller of the control system for the converting line includes data structures associated with manufacturing of the roll.

9. The method of claim 8 wherein the step of enabling the control includes enabling the control to send signals to a graphic user interface associated with the converting line indicative of a defect in the web based at least in part upon the data structures associated with the manufacturing of the roll.

10. The method of claim 8 wherein the step of enabling the control includes enabling the control to send signals to equipment in the converting line to make adjustments to operation of the converting line equipment based at least in part upon the data structures associated with the manufacturing of the roll.

11. The method of claim 1 wherein the step of storing the plurality of data structures in the memory of the controller of the control system for the converting line includes data structures comprising a plurality of data items associated together as diameter measurements and an amount of web material unwound from other rolls previously processed in the converting line; and wherein the step of enabling the control includes enabling the control to send signals to equipment in the converting line to make adjustments to operation of the equipment based at least in part upon the data structures associated with the diameter measurements, and the amount of the web material unwound from the other rolls previously processed in the converting line.

12. A control system for a converting line, the control system comprising:

a sensor configured to sense a distance between the sensor and a surface of a roll of web material wherein the roll of the web material is unwound from an unwinder and directed to the converting line and the roll of web material is non-uniformly round, the sensor being enabled to generate signals representative of the distance between the sensor and the roll as the roll rotates and the web material is unwound;

a controller including a processor and memory, the controller being configured to: (i) determine diameter measurements of the roll as the roll rotates based upon the sensor signals wherein the diameter measurements correspond to an amount of non-uniform roundness of roll; (ii) store a plurality of data structures in a memory of a controller of a control system wherein the data structures comprise a plurality of data items associated together as the diameter measurements of the roll; (iii) process by a statistical regression analysis the data structures associated with the diameter measurements; and (iv) generate signals for controlling the unwinder and the converting line based upon the processed diameter measurements.

13. The control system of claim 12 wherein the controller is configured to determine an amount of the web material unwound from the roll, store a plurality of data structures in the memory of the controller that include the amounts of the web material unwound from the roll, and generate signals for controlling the converting line based upon the processed diameter measurements and the amount of the web material unwound from the roll.

14. The control system of claim 13 wherein controller is enabled to send signals to a graphic user interface associated with the converting line, the signals being indicative of the amount of the web material unwound from the roll.

15. The control system of claim 13 wherein the controller is enabled to send signals to a graphic user interface associated with the converting line, the signals being indicative of a time to unwind an amount of the web material from the roll.

16. The control system of claim 13 wherein the controller is enabled to: (v) store in in the memory data structures comprising a plurality of data items associated together as the diameter measurements and the amount of web material unwound from other rolls of web material previously processed in the converting line; and (vi) send signals to equipment in the converting line to make adjustments to operation of the equipment based at least in part upon the data structures associated with the diameter measurements and the amount of web material unwound from the other rolls of web material previously processed in the converting line.

17. The control system of claim 12 wherein the controller is configured to determine a caliper measurement of the web based upon diameter measurements for successive rotations of the roll as the web is unwound from the roll, store a plurality of data structures in the memory of the controller that include the caliper measurements, process by a statistical regression analysis the data structures associated with the caliper measurements, and generate signals for controlling the converting line based upon the processed caliper measurements and the processed diameter measurements.

18. The control system of claim 12 wherein the controller is enabled to: (v) store in the memory data structures associated with manufacturing of the roll; and (vi) send signals to equipment in the converting line to make adjustments to operation of the equipment based at least in part upon the data structures associated with the manufacturing of the roll.

\* \* \* \* \*

UNITED STATES PATENT AND TRADEMARK OFFICE
CERTIFICATE OF CORRECTION

PATENT NO. : 11,254,535 B2
APPLICATION NO. : 16/372897
DATED : February 22, 2022
INVENTOR(S) : Cory L. Schubring, Scott K. Houle and Cory P. Gussert It is certified that error appears in the above-identified patent and that said Letters Patent is hereby corrected as shown below:

In the Specification

In Column 7, Line 17, replace "driven" with -- downstream guide --.
In Column 8, Line 59, replace "roll" with -- unwind --.
In Column 9, Line 9, replace "driven" with -- downstream guide --.

Signed and Sealed this
Sixth Day of August, 2024

Katherine Kelly Vidal
*Director of the United States Patent and Trademark Office*